INVENTOR.
WALTER R. OPPEN
BY
ATTORNEY

United States Patent Office 2,921,249
Patented Jan. 12, 1960

2,921,249

ELIMINATING SERVO DYNAMICS IN VELOCITY SERVOS

Walter R. Oppen, Plandome, N.Y., assignor to Sperry Rand Corporation, Ford Instrument Company Division, Long Island City, N.Y., a corporation of Delaware Application August 26, 1957, Serial No. 680,149

4 Claims. (Cl. 318—448)

This invention relates to improvements in systems the output velocity of which is a function of an input command signal.

Where servos are employed in electromechanical systems to drive a load, there is normally an associated time lag due to servo dynamics which results in output error. If the load is an integrator carriage or the dummy platform on the warrior fire control system for aircraft, the error under transient conditions is a function of a time derivative and constants provided by the individual units. According to this invention an auxiliary servo or some equivalent device which will furnish the required circuit values, is inserted in the system to compensate for servo errors which occur under transient conditions.

Therefore an object of the invention is to provide an improved drive system in which servo dynamic errors are eliminated.

Figure 1:
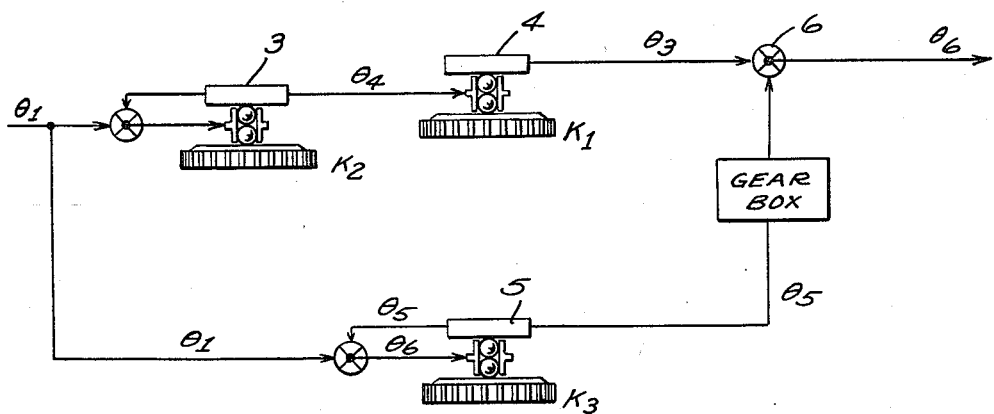
Figure 2:
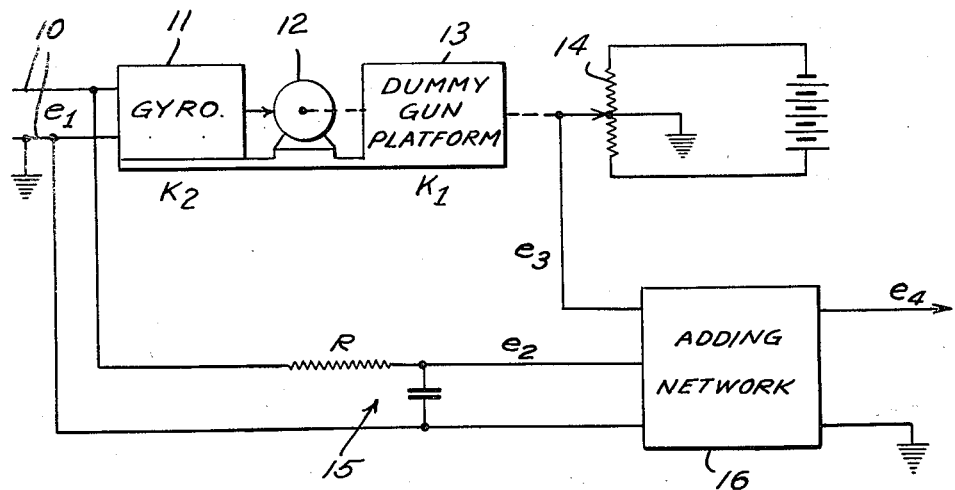

Other objects and advantages of the system may be appreciated on reading the description below in conjunction with the accompanying drawings in which:

Fig. 1 is a simple integrator system which embodies the principle of operation of a servo system with auxiliary devices to eliminate dynamic errors; and Fig. 2 is a schematic diagram of an improved driving platform drive system.

It may be easily demonstrated that in the simple integrator drive system as shown in Fig. 1 where integrator is employed to drive the carriage of integrator 4, the output $\theta_3$ of integrator 4 in terms of the input $\theta_1$ of the integrator 3 is as follows:

(1) $$p\theta_3 = \frac{K_1 K_2 \theta_1}{p + K_2}$$

where $p$ is $$\frac{d}{dt}$$

$K_1$ is the integrator constant of integrator 4 and $K_2$ is the integrator constant of integrator 3. Obviously, if there were no servo type drive for integrator 4, there is no error due to time lag and the relation of the output of the latter to its input would be as follows:

(2) $$p\theta_3 = K_1 \theta_1$$

However, this relation between input and output does not obtain, as shown by Equation 1, when the integrator 4 is servo driven as by another integrator. The change in output resulting from time lag is the dynamic error which occurs when the input is fed solely to a servo driven device such as integrator 4. When the input $\theta_1$ is also fed to an auxiliary device, integrator 5, the dynamic error of the integrator drive system may be eliminated. The output of the integrator 5 is modified by the gear ratio $n$ and is combined with the output of the integrator 4 in differential 6 whose output, $\theta_6$, relates to the input according to Equation 2. This is mathematically demonstrated as follows:

(3) $$\theta_6 = \theta_3 + n\theta_5$$

(4) $$p\theta_6 = p\theta_3 + np\theta_5$$
$$= \frac{K_1 K_2 \theta_1}{p + K_2} + \frac{K_3 n p \theta_1}{p + K_3}$$

If $$K_2 = K_3 = \frac{K_1}{n} = K$$

then (5) $$p\theta_6 = \frac{nk(p+K)\theta_1}{(p+K)} = nk\theta_1 = K_1\theta_1$$

where $K_3$ is the integrator constant of integrator 5 and $\theta_5$ is the output of the integrator 5.

It is not intended that the patent be limited to integrators which are shown to describe the principle of operation. Another specific application of the principle is in connection with the dummy gun drive in a fire control system for aircraft as schematically shown in Fig. 2.

An input signal $e_1$ on line 10 is employed to precess a rate gyro 11 which is used to control the space stabilizing servo 12 in dummy gun platform 13. Battery energized potentiometer 14 is driven by the platform mechanical error signal and the equivalent electrical signal $e_3$ is placed on one leg of adding network 16.

The input $e_1$ is also placed across an R.C. network 15 and fed to the other leg of the adding network 16 as error signal $e_2$. The output $e_4$ of the adding network is then esual to $e_3 + ne_2$. The output signal $e_4$ is the departure of the dummy gun platform from the axis of the guns on the plane and is employed to operate the radar antenna.

No data is available describing the response of the dummy gun platform to a step function input. However, report R-2 of the Instrumentation Laboratory, MIT, p. 181, describes the response of a rate gyro to a step function of rate and concludes that the output voltage of the gyro reached zero along a simple exponential type curve with a characteristic time of $\frac{1}{30}$ of a second when the angular velocity of the gyro was suddenly made zero by means of a mechanical stop. It is, therefore, assumed that the response of the dummy gun platform to a suddenly applied voltage will be a rate which increases along an exponential type curve in agreement with the following expression:

(6) $$pe_3 = K_1 \frac{K_2}{p + K_2} e_1$$

where $K_1$ is the dummy platform response constant and $K_2$ is the gyro constant in the transfer function relating its output to its input.

If, for the error compensating R.C. network (7) $$e_2 = \frac{e_1}{R.C.p + 1}$$

or (8) $$pe_2 = \frac{pe_1/R.C.}{\left(p + \frac{1}{R.C.}\right)}$$

and, as seen from Fig. 2, (9) $$pe_4 = pe_3 + npe_2$$

on substitution in Equation 9

(10) $$pe_4 = K_1 \frac{K_2 e_1}{p + K_2} + \frac{npe_1/R.C.}{p + \frac{1}{R.C.}}$$

and the R.C. circuit constants are selected as follows:

$$\frac{1}{R.C.} = K_2 \text{ and } \frac{n}{R.C.} = K_1$$

then

(11) $$pe_4 = K_1 e_1$$

which is the desired function for $pe_4$ with the servo dynamic error eliminated.

What is claimed is:

1. A drive system of the character described comprising a first mechanical integrator, a second mechanical integrator similar to said first mechanical integrator, a first differential through which an input signal is imparted to said first integrator, a second differential through which said input signal is also imparted to said second integrator, a third differential, means by which the output of said first integrator is imparted to said third differential and is fed back to said first differential, and means by which the output of said second integrator is fed back to said second differential and is imparted to said third differential for combining with the output of said first integrator, whereby the output velocity of said third differential is a function of said input signal.

2. A drive system of the character described comprising a first mechanical integrator, a second mechanical integrator similar to said first mechanical integrator, a first differential through which an input signal is imparted to said first integrator, a second differential through which said input signal is also imparted to said second integrator, a third differential, a third integrator similar to said first and second integrators which is interposed between said first integrator and said third differential, means by which the output of said first integrator is fed back to said first differential and is imparted to said third integrator, means by which the output of said third integrator is imparted to said third differential, and means by which the output of said second integrator is fed back to said second differential and is imparted to said third differential for combining with the output of said third integrator, whereby the output velocity of said third differential is a function of said input signal.

3. A drive system as defined in claim 1 in which means are provided by which the output of said third differential is imparted to a gyro whose procession rate is proportioned to said input signal and by which a dummy platform is stabilized in space.

4. A drive system as defined in claim 2 in which means are provided by which the output of said third differential is imparted to a gyro whose procession rate is proportioned to said input signal and by which a dummy platform is stabilized in space.

References Cited in the file of this patent

UNITED STATES PATENTS 2,798,992  Adler et al. _____ July 9, 1957

OTHER REFERENCES

Ahrendt, W. R.: Servomechanism Practice, page 115, Fig. 8–1, McGraw-Hill, New York, 1954.